(12) United States Patent
Liang et al.

(10) Patent No.: US 10,015,054 B2
(45) Date of Patent: Jul. 3, 2018

(54) PACKET FORWARDING

(71) Applicant: Hangzhou H3C Technologies Co., Ltd., Hangzhou (CN)

(72) Inventors: Xuewei Liang, Beijing (CN); Xiaoan Zhang, Beijing (CN); Yutao Li, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 241 days.

(21) Appl. No.: 14/892,412

(22) PCT Filed: Jun. 9, 2014

(86) PCT No.: PCT/CN2014/079455
§ 371 (c)(1),
(2) Date: Nov. 19, 2015

(87) PCT Pub. No.: WO2014/194867
PCT Pub. Date: Dec. 11, 2014

(65) Prior Publication Data
US 2016/0094400 A1 Mar. 31, 2016

(30) Foreign Application Priority Data
Jun. 7, 2013 (CN) .......................... 2013 1 0225743

(51) Int. Cl.
*H04L 12/24* (2006.01)
*H04L 12/931* (2013.01)
(52) U.S. Cl.
CPC .............. *H04L 41/12* (2013.01); *H04L 49/70* (2013.01)
(58) Field of Classification Search
CPC ... H04L 41/12; H04L 12/6418; H04L 45/583; H04L 41/0803; H04L 12/4625; H04L 41/08
See application file for complete search history.

(56) References Cited

U.S. PATENT DOCUMENTS 6,496,502 B1 * 12/2002 Fite, Jr. ............... H04L 12/4641
370/338
6,801,527 B1 * 10/2004 O'Keeffe .............. H04L 45/745
370/386
(Continued)

FOREIGN PATENT DOCUMENTS

CN 1722705 1/2006
CN 1725734 1/2006
(Continued)

OTHER PUBLICATIONS

"Method to Implement Low Cost and Highly Available Dual Site Network Design", IP COM Journal IP COM Inc West Henrietta, NY, US, Oct. 2, 2886 (2886-18-82), XP813116182, ISSN: 1533-8881 * p. 3-4; figures 3, 4 *.
(Continued)

*Primary Examiner* — Kashif Siddiqui
(74) *Attorney, Agent, or Firm* — DEQI Intellectual Property Law Corporation

(57) ABSTRACT

A member device of a stacked switches system receives a packet which is to be sent to every member device in the stack groups of the stacked switches system. The member device identifies an intra-group port and an aggregated stack link group which permit forwarding the packet based on an ingress member device identification of the packet. The member device sends the packet carrying the ingress member device identification via the identified intra-group stack port, via the identified aggregated stack link group and via a local data port.

20 Claims, 12 Drawing Sheets

(56) References Cited

U.S. PATENT DOCUMENTS

| | | | |
|---|---|---|---|
| 6,999,452 B1* | 2/2006 | Drummond-Murray | H04L 12/42 370/386 |
| 8,705,524 B1* | 4/2014 | Kelly | H04L 29/0653 370/387 |
| 2002/0085586 A1* | 7/2002 | Tzeng | H04L 12/5601 370/475 |
| 2005/0105560 A1* | 5/2005 | Mann | H04L 45/02 370/503 |
| 2006/0023640 A1* | 2/2006 | Chang | H04L 41/0803 370/254 |
| 2006/0092853 A1* | 5/2006 | Santoso | H04L 45/583 370/252 |
| 2006/0227735 A1 | 10/2006 | Baird et al. | |
| 2008/0301319 A1* | 12/2008 | Dernosek | H04L 12/66 709/232 |
| 2012/0020373 A1* | 1/2012 | Subramanian | H04L 45/58 370/419 |
| 2012/0281695 A1* | 11/2012 | Agarwal | H04L 45/583 370/389 |
| 2012/0314581 A1* | 12/2012 | Rajamanickam | H04L 41/0826 370/238 |
| 2013/0010636 A1* | 1/2013 | Regula | H04L 49/1515 370/254 |
| 2014/0044006 A1* | 2/2014 | Chen | H04L 41/145 370/254 |
| 2014/0307553 A1* | 10/2014 | Fung | H04L 47/125 370/235 |

FOREIGN PATENT DOCUMENTS

| | | |
|---|---|---|
| CN | 1728688 | 2/2006 |
| CN | 1885810 | 12/2006 |
| CN | 101141404 | 3/2008 |
| CN | 101163093 B | 4/2008 |
| CN | 101594304 | 12/2009 |
| CN | 101699789 B | 4/2010 |

OTHER PUBLICATIONS

Ananda S: "Blade server topology options with external Top of Rack switches for EqualLogic arrays—Part 2", Jan. 7, 2013 (Jan. 7, 2013), XP055330397, Dell TechCenter Biogs, 7 pages.

International Search Report and Written Opinion dated Sep. 4, 2014, PCT Patent Application No. PCT/CN2014/079455 dated Jun. 9, 2014, The State Intellectual Property Office, P.R. China.

* cited by examiner

| source forwarding information of the switch 201 | |
|---|---|
| Port forbidden | chip ID |
| P1 | 4~7, 8~15, 16~23, 24~31 |
| P2 | 2~7 |
| G1 | 2~7, 16~23, 24~31 |
| G2 | 2~7, 8~15, 16~23, 24~31 |

| source forwarding information of the switch 202 | |
|---|---|
| Port forbidden | chip ID |
| P1 | 0, 1, 6, 7 |
| P2 | 0, 1, 4, 5, 6, 7 |
| G1 | 0, 1, 4, 5, 6, 7<br>8~15, 16~23, 24~31 |
| G2 | 0, 1, 4, 5, 6, 7<br>8~15, 16~23, 24~31 |

| source forwarding information of the switch 203 | |
|---|---|
| Port forbidden | chip ID |
| P1 | 0, 1, 2, 3 |
| P2 | 0, 1, 2, 3, 6, 7 |
| G1 | 0, 1, 2, 3, 6, 7<br>8~15, 16~23, 24~31 |
| G2 | 0, 1, 2, 3, 6, 7<br>8~15, 16~23, 24~31 |

| source forwarding information of s the witch 204 | |
|---|---|
| Port forbidden | chip ID |
| P1 | 2, 3, 4, 5, |
| P2 | 0, 1, 2, 3, 4, 5, 6<br>8~15, 16~23, 24~31 |
| G1 | 0, 1, 2, 3, 4, 5<br>8~15, 16~23, 24~31 |
| G2 | 0, 1, 2, 3, 4, 5<br>8~15, 16~23, 24~31 |

*Fig.3A*

| source forwarding information of the switch 205 | |
|---|---|
| Port forbidden | chip ID |
| P1 | 0 ~ 7, 12 ~ 15<br>16~23, 24~31 |
| P1 | 10 ~ 15 |
| G1 | 0 ~ 7, 10 ~ 15, 24~31 |
| G2 | 0 ~ 7, 10 ~ 15,<br>16 ~ 23, 24 ~ 31 |

| source forwarding information of the switch 206 | |
|---|---|
| Port forbidden | chip ID |
| P1 | 8, 9, 14, 15 |
| P2 | 8, 9, 12, 13<br>14, 15 |
| G1 | 0 ~ 7, 8, 9, 12, 13<br>14, 15, 16 ~ 23, 24 ~ 31 |
| G2 | 0 ~ 7, 8, 9, 12, 13<br>14, 15, 16 ~ 23, 24 ~ 31 |

| source forwarding information of the switch 207 | |
|---|---|
| Port forbidden | chip ID |
| P1 | 8, 9, 10, 11 |
| P2 | 8, 9, 10, 11, 14, 15 |
| G1 | 0 ~ 7, 8, 9, 10, 11<br>14, 15, 16 ~ 23, 24~31 |
| G2 | 0 ~ 7, 8, 9, 10, 11<br>14, 15, 16 ~ 23, 24 ~ 31 |

| source forwarding information of the switch 208 | |
|---|---|
| Port forbidden | chip ID |
| P1 | 10, 11, 12, 13 |
| P2 | 0 ~ 7, 8, 9, 10, 11<br>12, 13, 24, 31 |
| G1 | 0 ~ 7, 8, 9, 10, 11<br>12, 13, 16 ~ 23, 24~31 |
| G2 | 0 ~ 7, 8, 9, 10, 11<br>12, 13, 16 ~ 23, 24~31 |

*Fig.3B* source forwarding information of the switch 209

| Port forbidden | chip ID |
|---|---|
| P1 | 0 ~ 7, 8 ~ 15, 20, 21, 22, 23 |
| P2 | 18, 19, 20, 21, 22, 23 |
| G1 | 0 ~ 7, 8 ~ 15, 18, 19 20, 21, 22, 23 |
| G2 | 0 ~ 7, 8 ~ 15, 18, 19 20, 21, 22, 23, 24 ~ 31 | source forwarding information of the switch 210

| Port forbidden | chip ID |
|---|---|
| P1 | 16, 17, 22, 23 |
| P2 | 16, 17, 20, 21, 22, 23 |
| G1 | 0 ~ 7, 8 ~ 15, 16, 17, 20, 21, 22, 23, 24 ~ 31 |
| G2 | 0 ~ 7, 8 ~ 15, 16, 17, 20, 21, 22, 23, 24 ~ 31 | source forwarding information of the switch 211

| Port forbidden | chip ID |
|---|---|
| P1 | 16, 17, 18, 19 |
| P2 | 16, 17, 18, 19, 22, 23 |
| G1 | 0 ~ 7, 8 ~ 15, 16, 17, 18, 19, 22, 23, 24 ~ 31 |
| G2 | 0 ~ 7, 8 ~ 15, 16, 17, 18, 19, 22, 23, 24 ~ 31 | source forwarding information of the switch 212

| Port forbidden | chip ID |
|---|---|
| P1 | 18, 19, 20, 21 |
| P2 | 0 ~ 7, 8 ~ 15, 16, 17, 18, 19 |
| G1 | 0 ~ 7, 8 ~ 15, 16, 17, 18, 19, 20, 21, 24 ~ 31 |
| G2 | 0 ~ 7, 8 ~ 15, 16, 17, 18, 19, 20, 21, 24 ~ 31 |

*Fig.3c*

| source forwarding information of the switch 213 ||
|---|---|
| Port forbidden | chip ID |
| P1 | 0 ~ 7, 8 ~ 15, 16 ~ 23<br>28, 29, 30, 31 |
| P2 | 26, 27, 28, 29, 30, 31 |
| G1 | 8~15, 16 ~ 23<br>26, 27, 28, 29, 30, 31 |
| G2 | 0 ~ 7, 8~15, 16 ~ 23<br>26, 27, 28, 29, 30, 31 |

| source forwarding information of the switch 214 ||
|---|---|
| Port forbidden | chip ID |
| P1 | 24, 25, 30, 31 |
| P2 | 24, 25, 28, 29, 31 |
| G1 | 0 ~ 7, 8~15, 16 ~ 23<br>24, 25, 28, 29, 30, 31 |
| G2 | 0 ~ 7, 8~15, 16 ~ 23<br>24, 25, 28, 29, 30, 31 |

| local source forwarding information of the switch 215 ||
|---|---|
| Port forbidden | chip ID |
| P1 | 24, 25, 26, 27 |
| P2 | 24, 25, 26, 27, 30, 31 |
| G1 | 0 ~ 7, 8~15, 16 ~ 23<br>24, 25, 26, 27, 30, 31 |
| G2 | 0 ~ 7, 8~15, 16 ~ 23<br>24, 25, 26, 27, 30, 31 |

| source forwarding information of the switch 216 ||
|---|---|
| Port forbidden | chip ID |
| P1 | 26, 27, 28, 29 |
| P2 | 0 ~ 7, 8 ~ 15, 16 ~ 23<br>24, 25, 26, 27, 28, 29 |
| G1 | 0 ~ 7, 8~15, 16 ~ 23<br>24, 25, 26, 27, 28, 29 |
| G2 | 0 ~ 7, 8~15, 16 ~ 23<br>24, 25, 26, 27, 28, 29 |

*Fig.3D*

| source forwarding information of the switch 401 | |
|---|---|
| Port forbidden | ID |
| P1 | |
| P2 | 2,3,4,5 |
| G1 | |
| G2 | 2~17 |

| source forwarding information of the switch 402 | |
|---|---|
| Port forbidden | ID |
| P1 | 0,1 |
| P2 | 4,5 |
| G1 | |
| G2 | 0,1,4,5,6~17 |

| source forwarding information of of the switch 403 | |
|---|---|
| Port forbidden | ID |
| P1 | 0,1,2,3 |
| P2 | |
| G1 | |
| G2 | 0,1,2,3,6~17 |

| source forwarding information of the switch 404 | |
|---|---|
| Port forbidden | ID |
| P1 | |
| P2 | 8,9,10,11 |
| G1 | 0~5, 8,9,10,11 |
| G2 | 8~17 |

| source forwarding information of the switch 405 | |
|---|---|
| Port forbidden | ID |
| P1 | 6,7 |
| P2 | 10,11 |
| G1 | 0~7,10~17 |
| G2 | 0~7,10~17 |

| source forwarding information of the switch 406 | |
|---|---|
| Port forbidden | ID |
| P1 | 6,7,8,9 |
| P2 | |
| G1 | 0~9,12~17 |
| G2 | 0~9,12~17 |

| source forwarding information of the switch 407 | |
|---|---|
| Port forbidden | ID |
| P1 | |
| P2 | 14,15,16,17 |
| G1 | 0~11, 14~17 |
| G2 | |

| source forwarding information of the switch 408 | |
|---|---|
| Port forbidden | ID |
| P1 | 12,13 |
| P2 | 16,17 |
| G1 | 0~11,12,13,16,17 |
| G2 | |

| source forwarding information of the switch 402 | |
|---|---|
| Port forbidden | ID |
| P1 | 12,13,14,15 |
| P2 | |
| G1 | 0~15 |
| G2 | |

Fig.5 source forwarding information of the switch 601

| Port forbidden | ID |
|---|---|
| P1 | 2,3,4,5,6,7 |
| P2 | 0,1,2,3 |
| G1 | 2,3,4,5,6,7 |
| G2 | 0,1,2,3,4,5,6,7 | source forwarding information of the switch 602

| Port forbidden | ID |
|---|---|
| P1 | 0,1 |
| P2 | 0,1,2,3,4,5,6,7 |
| G1 | 0,1,4,5,6,7 |
| G2 | 0,1,2,3,4,5,6,7 | source forwarding information of the switch 603

| Port forbidden | ID |
|---|---|
| P1 | 0,1,2,3,6,7 |
| P2 | 4,5,6,7 |
| G1 | 0,1,2,3,6,7 |
| G2 | 0,1,2,3,4,5,6,7 | source forwarding information of the switch 604

| Port forbidden | ID |
|---|---|
| P1 | 4,5 |
| P2 | 0,1,2,3,4,5,6,7 |
| G1 | 0,1,2,3,4,5 |
| G2 | 0,1,2,3,4,5,6,7 |

*Fig.7* source forwarding
information of the switch 601

| Port allowed | Source ID |
|---|---|
| P1 | 0,1 |
| P2 | 4,5,6,7 |
| A1 | 0,1 |
| A2 | | source forwarding information
of the switch 602

| Port allowed | Source ID |
|---|---|
| P1 | 2,3,4,5,6,7, |
| P2 | |
| A1 | 2,3 |
| A2 | | source forwarding information
of the switch 603

| Port allowed | Source ID |
|---|---|
| P1 | |
| P2 | 0,1,2,3 |
| A1 | 4,5 |
| A2 | | source forwarding
information of the switch 604

| Port allowed | Source ID |
|---|---|
| P1 | 2,3,4,5,6,7, |
| P2 | |
| A1 | 6,7 |
| A2 | |

*Fig.8*

PACKET FORWARDING

CLAIM FOR PRIORITY

The present application is a national stage filing under 35 U.S.C. § 371 of PCT application number PCT/CN2014/079455, having an international filing date of Jun. 9, 2014, which claims priority to Chinese patent application number 201310225743.4, having a filing date of Jun. 7, 2013, the disclosures of which are hereby incorporated by reference in their entireties.

BACKGROUND

Stack refers to combining more than one switching devices to work together, so as to provide more ports in a limited space. Multiple switching devices supporting the stack may be connected with each other to form a virtual device. The virtual device may be referred to as a stacked switches system. Each switching device included in the stacked switches system may be referred to as a member device.

BRIEF DESCRIPTION OF THE DRAWINGS

FIGS. 3A-3D are diagrams illustrating source forwarding information of each switch in the example shown in FIG. 2;

FIG. 5 is a diagram illustrating source forwarding information of each switch in the example shown in FIG. 4;

FIG. 7 is a diagram illustrating source forwarding information of each switch in the example shown in FIG. 6;

FIG. 8 is a diagram illustrating another source forwarding information of each switch in the example shown in FIG. 6.

DETAILED DESCRIPTION

Hereinafter, the present disclosure will be described in further detail with reference to the accompanying drawings and examples to make the technical solution and merits therein clearer.

In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, and the term "including" means including but not limited to. The term "based on" means based at least in part on. In addition, the terms "a" and "an" are intended to denote at least one of a particular element.

Figure 1:
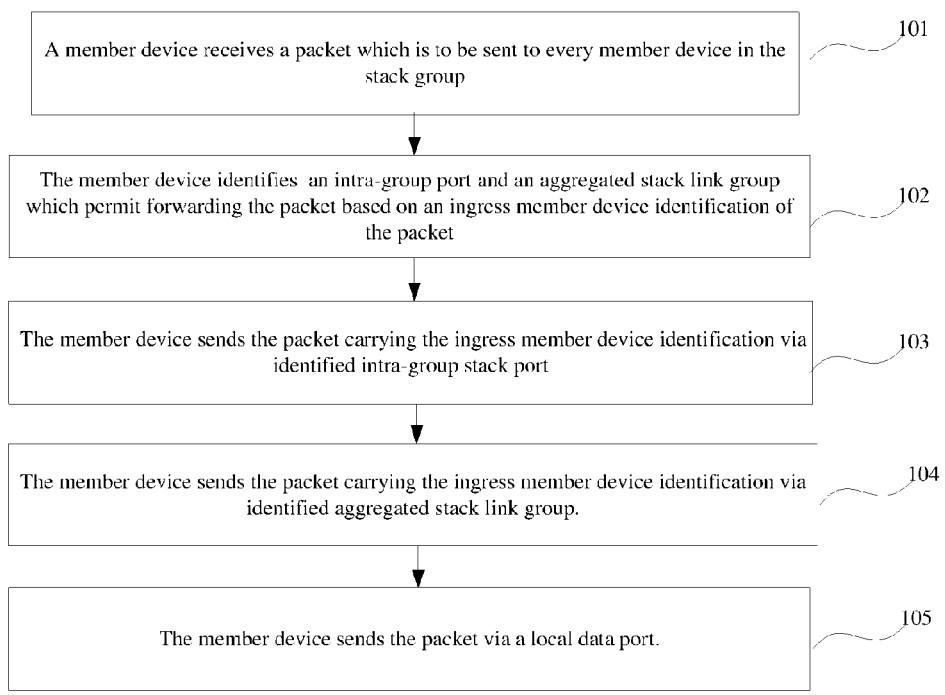
FIG. 1 is a flowchart illustrating a packet forwarding method according to an example.

FIG. 1 is a flowchart illustrating a packet forwarding method according to an example of the present disclosure. The stacked switches system may include at least two stack groups and a plurality of member devices, in which the number of the member devices is greater than the number of the stack groups. Intra-group stack ports of the member devices in each stack group may be connected to each other via stack links to form a physical ring or chain topology. The stack groups may be connected to each other via aggregated stack link groups. As shown in FIG. 1, the method may include following operations.

In Block 101, a member device may receive a packet which is to be sent to every member device in the stack groups.

In Block 102, the member device may identify an intra-group port and an aggregated stack link group which permit forwarding the packet based on an ingress member device identification of the packet. Here, each member device may be associated with an exclusive identification (ID), or, a forwarding chip of each member device may bind with an exclusive ID. The ingress member device identification may refer to a member device through which the packet originally entered into the stacked switches system.

The ingress member device identification may be added to the packet by the ingress member device. Thus, if the member device of block 101 is not the ingress member device, the packet received at block 101 will already include an ingress member device identification; and if the member device of block 101 is the ingress member device then it may add an ingress member device identification to the packet.

In Block 103, the member device may send the packet carrying the ingress member device identification via the identified intra-group stack port.

In Block 104, the member device may send the packet carrying the ingress member device identification via the identified aggregated stack link group.

In Block 105, the member device may send the packet via a local data port. Therein, the forwarded packet may for example be a broadcast packet, or a multicast packet, or an unknown unicast packet.

A FIRST EXAMPLE

Figure 2:
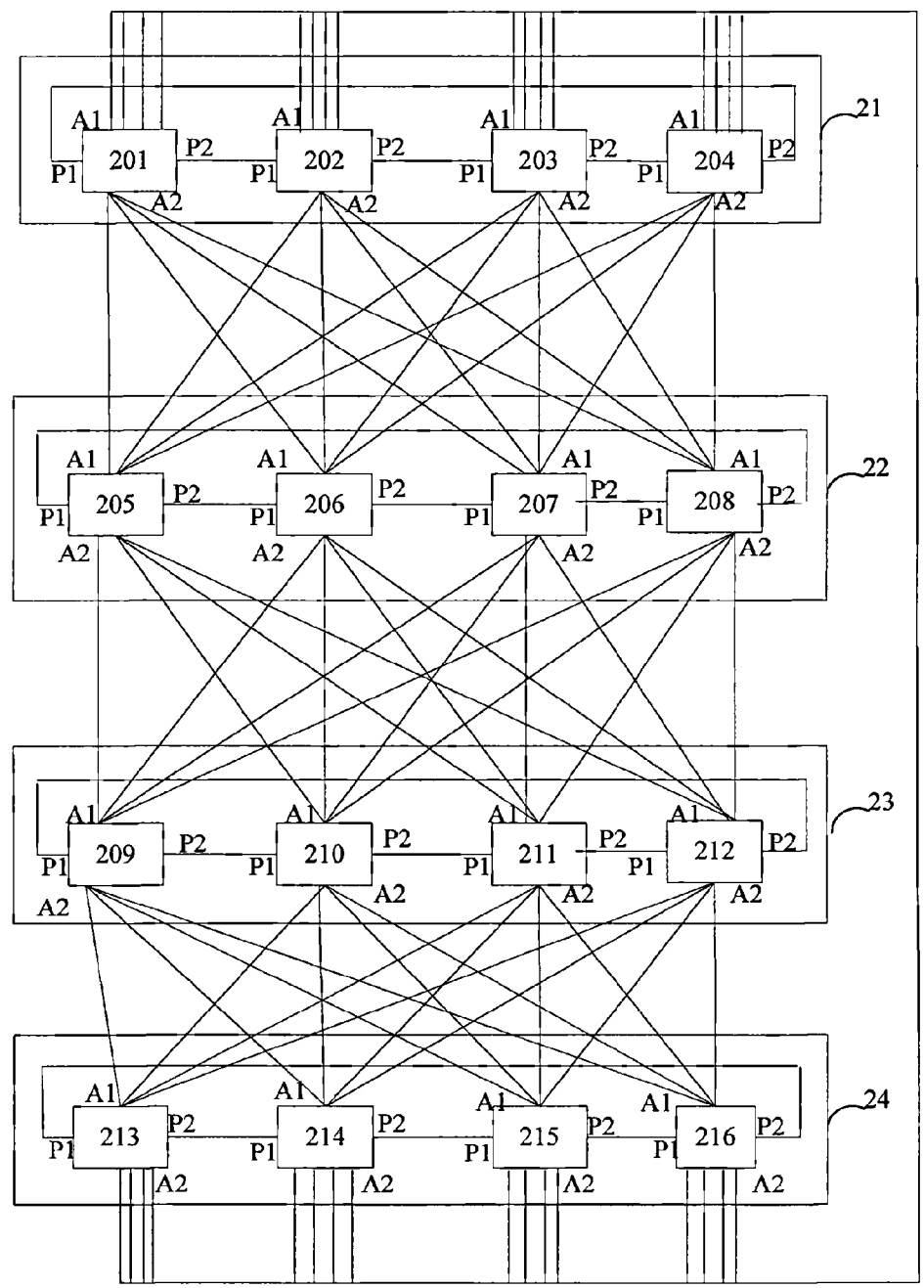
FIG. 2 is a diagram illustrating a stacked switches system in an example.

The stacked switches system shown in FIG. 2 includes four stack groups: stack groups 21 to 24. The switches of stack groups 21 to 24 are all set with valid stack ports P1 and P2. Different types of valid stack ports P1 and P2 of two adjacent switches in the same stack group are connected to one another through stack links, so as to form a loop connection among switches within each stack group. Hereinafter the stack ports P1 and P2 are referred to as 'intra-group stack ports and the stack ports A1 and A2 are referred to as 'inter-group stack ports.

In stack group 21, switches 201 and 202 are adjacent to each other, switches 202 and 203 are adjacent to each other, switches 203 and 204 are adjacent to each other and switches 204 and 201 are adjacent to each other. So stack port P2 of the switch 201 is connected to stack port P1 of the switch 202 through a stack link, stack port P2 of the switch 202 is connected to stack port P1 of the switch 203 through a stack link, stack port P2 of the switch 203 is connected to stack port P1 of the switch 204 through a stack link, stack port P2 of the switch 204 is connected to stack port P1 of the switch 201 through a stack link. In this way switches 201 to 204 may be connected with each other to form a stack group 21 with the ring topology, by using stack links.

Based on the same principle, switches 205~208 may be connected with each other to form a stack group 22 with the ring topology, by using stack links; switches 209~212 may be connected with each other to form a stack group 23 with the ring topology, by using stack links; and switches 213~216 may be connected with each other to form a stack group 24 with the ring topology, by using stack links.

Two stack groups are adjacent to each other when their member devices are connected with stack links. The switches of the four stack groups are all set with valid stack ports A1 and A2. Therein, stack group 21 and 24 are adjacent to each other, stack group 21 and 22 are adjacent to each other, stack groups 22 and 23 are adjacent to each other, stack groups 23 and 24 are adjacent to each other. The four stack ports A1 of the switch 201 are connected respectively to one stack port A2 of the switch 213, one stack port A2 of the switch 214, one stack port A2 of the switch 215 and one stack port A2 of the switch slot 216 through stack links. The four stack ports A2 of the switch 201 are connected respectively to one stack port A1 of the switch 205, one stack port A1 of the switch 206, one stack port A1 of the switch 207 and one stack port A1 of the switch 208 through stack links.

Stack ports A1 and A2 of the switches 202~204 are connected to stack ports A2 of the switches 213~216 and to stack ports A1 of the switches 205~208 in the same principle. Stack ports A2 of the switches 205~208 are connected to stack ports A1 of 209~212 in the same principle. Stack ports A2 of the switches 209~212 are connected to stack ports A1 of the switches 213~216 in the same principle.

When topology of the stacked switches system shown in FIG. 2 is converged, the on-work stack ports A1 of the switches 201~204 are associated with a first aggregated stack link group G1 of stack group 21, and the on-work stack ports A2 of the switches 201~204 are associated with a second aggregated stack link group G2 of stack group 21. In the same principle, the on-work stack ports A1 and A2 of each switch in stack groups 22 to 24 are associated with a first aggregated stack link group G1 and a second aggregated stack link group G2 of their own stack group respectively.

In the present disclosure, each switch of the stacked switches system is bound with an exclusive identification (ID), or in another implementation the forwarding chip of each switch is bound with an exclusive ID. In the present example, the forwarding chip of each switch is bound with an exclusive ID, and it is assumed that each switch shown in FIG. 2 may have two forwarding chips. The member IDs of the switches 201 to 216 are respectively slot 1 to slot 16. The forwarding chips of each switch shown in FIG. 2 are associated with IDs shown in Table 1 as below:

data ports belonging to multicast group G200 according to a group ID of the multicast packet.

The chip which the data port 11 locates on is associated with ID0, and the switch 201 may add ID0 and port 11 to the multicast packet as a source ID and a source port respectively. The switch 201 may search In this way source forwarding information based on ID0, and may fail to find any of stack port P1, stack port P2, aggregated stack link group G1 and aggregated stack link group G2, and send the multicast packet carrying ID0 and port 11 to the switch 204 through stack port P1, send the multicast packet carrying ID0 and port 11 to the switch 202 through stack port P2, send the multicast packet carrying ID0 and port 11 to stack group 24 through inter-group aggregated stack link group G1, and send the multicast packet carrying ID0 and port 11 to stack group 22 through inter-group aggregated stack link group G2. The switch 201 may select a stack port A1 and a stack port A2 on itself respectively from inter-group aggregated stack link groups G1 and G2, and send the multicast packet carrying ID0 and port 11 through the selected stack ports A1 and A2. when the stack port A1 selected by the switch 201 is connected to the stack port A2 of the switch slot 216 through a stack link, the multicast packet carrying ID0 and port 11 is sent to the switch 216. when the stack port A2 selected by the switch 201 is connected to the stack port A1 of the switch 205 through a stack link, the multicast packet carrying ID0 and port 11 is sent to the switch 205.

The switch 202 may receive the multicast packet carrying ID0 and Port 11 through stack port P1, and send the multicast packet with ID0 and Port 11 being removed through every local data port of multicast group 200, search local source forwarding information based on the ID0, find two stack ports P2 and P1 as well as two aggregated stack link groups G1 and G2 (such as, there is neither stack port nor aggregated stack link group that is permitted for forwarding the multicast packet by the switch 202), and then may discard the multicast packet carrying ID0 and port 11.

The switch 204 may receive the multicast packet carrying ID0 and port 11 through stack port P2, and send the multicast packet with ID0 and port 11 being removed through each data port of multicast group 200, search local source forwarding information based on the ID0, and fail to find stack port P1 (such as, the switch 204 may find stack port P2 as well as aggregated stack link groups G1 and G2 based on the

TABLE 1

| Slot ID | Slot1 | Slot2 | Slot3 | Slot4 | Slot5 | Slot6 | Slot7 | Slot8 | Slot9 | Slot10 | Slot11 | Slot12 | Slot13 | Slot14 | Slot15 | Slot16 |
|---|---|---|---|---|---|---|---|---|---|---|---|---|---|---|---|---|
| Binding ID | 0, 1 | 2, 3 | 4, 5 | 6, 7 | 8, 9 | 10, 11 | 12, 13 | 14, 15 | 16, 17 | 18, 19 | 20, 21 | 22, 23 | 24, 25 | 26, 27 | 28, 29 | 30, 31 |

FIG. 3A-3D is a diagram illustrating source forwarding information of each switch, the process of the stacked switches system forwarding a multicast packet will be illustrated hereinafter with reference to FIGS. 2 and 3A-3D:

The switch 201 receives a multicast packet of which the destination MAC address is a multicast address of multicast group G200 through a local data port 11 (not shown in FIG. 2) belonging to VLAN10. The switch 201 may find data ports belonging to multicast group 200 according to multicast group address G200 of the multicast packet, and send the multicast packet through the data ports belonging to multicast group G200 except data port 11 (i.e. all ports in the multicast group, except the port through which the multicast packet was originally received). The switch 201 may find the ID0), and then send the multicast packet carrying ID0 and port 11 to the switch 203 through stack port P1.

The switch 203 may receive the multicast packet carrying ID0 and port 11 through stack port P2, and send the multicast packet with ID0 and port 11 being removed through each data port of multicast group 200, search local source forwarding information based on the ID0, and find stack ports P2 and P1 as well as aggregated stack link groups G1 and G2, and then discards the multicast packet carrying ID0 and port 11.

The switch 205 may receive the multicast packet carrying ID0 and port 11 through stack port A1, and send the multicast packet with ID0 and port 11 being removed through each data port of multicast group 200, search local source forwarding information based on the ID0, and fail to find stack port P2 (such as, the switch 205 may find stack port P1 as well as aggregated stack link groups G1 and G2), and then send the multicast packet carrying ID0 and port 11 to the switch 206 through stack port P2.

The switch 206 may receive the multicast packet carrying ID0 and port 11 through stack port P1, and send the multicast packet removed of ID0 and port 11 through each data port of multicast group 200. The switch 206 may search local source forwarding information based on the ID0, and fail to find either stack port P1 or stack port P2, and the switch 206 may send the multicast packet carrying ID0 and port 11 to the switch 207 through stack port P2 that has not received this multicast packet.

The switch 207 may receive the multicast packet carrying ID0 and port 11 through stack port P1, and send the multicast packet with ID0 and port 11 being removed through each data port of multicast group 200. The switch 207 may search local source forwarding information based on the ID0, and fail to find either stack port P1 or stack port P2, and the switch 207 may send the multicast packet carrying ID0 and port 11 to the switch 208 through stack port P2 that has not received this multicast packet.

The switch 208 may receive the multicast packet carrying ID0 and port 11 through stack port P1, and send the multicast packet with ID0 and port 11 being removed through each data port of multicast group 200, search local source forwarding information based on the ID0, and the switch 208 may fail to find stack port P1 but it is stack port P1 that has received the multicast packet, so the switch 208 may discard the multicast packet carrying ID0 and port 11.

The switch 216 may receive the multicast packet carrying ID0 and port 11 through stack port P2, and send the multicast packet with ID0 and port 11 being removed through each data port of multicast group 200. The switch 216 may search local source forwarding information based on the ID0, and may fail to find stack port P1, and the switch may send the multicast packet carrying ID0 and port 11 to the switch 215 through stack port P1.

The switch 215 may receive the multicast packet carrying ID0 and port 11 through stack port P2, and may send the multicast packet with ID0 and port 11 being removed through each data port of multicast group 200. The switch 215 may search local source forwarding information based on the ID0, and send the multicast packet carrying ID0 and port 11 to the switch 214 through stack port P1.

The switch 214 may receive the multicast packet carrying ID0 and port 11 through stack port P2, and send the multicast packet with ID0 and port 11 being removed through each data port of multicast group 200. The switch 214 may search local source forwarding information based on the ID0, and send the multicast packet carrying ID0 and port 11 to the switch 213 through stack port P1.

The switch 213 may receive the multicast packet carrying ID0 and port 11 through stack port P2, and send the multicast packet with ID0 and port 11 being removed through each data port of multicast group 200. The switch 213 may search local source forwarding information based on the ID0, and send the multicast packet carrying ID0 and port 11 to stack group 23 through aggregated stack link group G1. The switch 213 may select a stack port A1 that belongs to the local device from inter-group aggregated stack link group G1, and send the multicast packet carrying ID0 and port 11 through the selected stack port A1. when the stack port A1 selected by the switch 213 is connected to the stack port A2 of the switch 210 through a stack link, the switch 213 sends the multicast packet carrying ID0 and port 11 to the switch 210.

The switch 210 may receive the multicast packet carrying ID0 and port 11 through stack port P2, and send the multicast packet with ID0 and port 11 being removed through each data port of multicast group 200. The switch 210 may search local source forwarding information based on the ID0, and send the multicast packet carrying ID0 and port 11 to the switches 209 and 211 through stack ports P1 and P2 respectively.

The switch 209 may receive the multicast packet carrying ID0 and port 11 through stack port P2, and send the multicast packet with ID0 and port 11 being removed through each data port of multicast group 200. The switch 209 may search local source forwarding information based on the ID0, determine that stack port P2 is the one that has received the multicast packet, and then discards the multicast packet carrying ID0 and port 11.

The switch 211 may receive the multicast packet carrying ID0 and port 11 through stack port P1, and may send the multicast packet multicast packet through each data port of multicast group 200. The switch 211 may search local source forwarding information based on the ID0, and send the multicast packet carrying ID0 and port 11 to the switch 212 through stack port P2.

The switch 212 may receive the multicast packet carrying ID0 and port 11 through stack port P1, and send the multicast packet multicast packet through each data port of multicast group 200. The switch 211 may search local source forwarding information based on the ID0, determine that stack port P1 is the only one that is permitted for forwarding packets and is the one that has received the multicast packet, and then discard the multicast packet carrying ID0 and port 11.

Till now, the multicast packet which is ingressed into the stacked switches system by the switch 201 is sent to the other switches in the stacked switches system, and those the switches send the multicast packet to multicast receivers of multicast group 200.

When the switch 201 receives a broadcast packet or an unknown unicast address through a data port 12 (not shown in FIG. 2) belonging to VLAN10, the switch 201 forwards the broadcast packet or the unknown unicast packet through other data ports of VLAN10, and sends the broadcast packet or the unknown unicast packet to the neighbor switches 202 and 204 as well as neighbor stack groups 22 and 24 based on source forwarding information. Finally, all the switches in the stacked switches system may receive the broadcast packet or the unknown unicast packet belonging to VLAN10 that ingressed by the switch 201 and forward this packet to hosts within VLAN10 through the data ports of VLAN10.

In FIG. 3, the local source forwarding information of each switch records the correspondence between chip IDs and stack ports/aggregated stack link groups that are forbidden for forwarding.

In an example, each switch may send a multicast packet, broadcast packet or unknown unicast packet which is ingressed into the stacked switches system via itself (such as the multicast packet, broadcast packet or unknown unicast packet received from its local data port) to a switch in a neighbor stack group, where in each stack group, there is only one switch that is permitted for sending the multicast packet, broadcast packet or unknown unicast packet which is ingressed into the stacked switches system via a switch in other stack groups to a switch of a neighbor stack group. The switches 201, 205, 209 and 210 in FIG. 2 are specified as those permitted for sending the broadcast packet from other stack groups to one the switch of a neighbor stack group. This may avoid broadcast storm in the stacked switches system.

In one example, a pair of connected stack ports is selected from each stack group, and is forbidden to send any multicast packet, broadcast packet or unknown unicast packet which is ingressed from other stack groups. For an example in FIG. 2, stack port P1 of the switch 201 and stack port P2 of the switch 202 in the stack group 21, stack port P1 of the switch 205 and stack port P2 of the switch 208 in the stack group 22, stack port P1 of the switch 209 and stack port P2 of the switch 212 in the stack group 23, and stack port P1 of the switch 213 and stack port P2 of the switch 216 in the stack group 24. This may avoid broadcast storm in each stack group.

In one example, since stack group 21 to 24 are connected in a ring principle, there are two paths from one stack group to another, one path is selected from the two paths as the forwarding path according to the principle of the shortest path forwarding. In this way, the multicast packet, broadcast packet or unknown unicast packet ingressed by the switches of each stack group may be sent to another stack group via shortest path. If the two paths have the same number of hops, the path passing the preferable aggregated stack link group is selected as the forwarding path. For example, in FIG. 2, the first aggregated stack link group G1 of each stack group is the preferable aggregated stack link group.

In another example, as the switches in the each stack group are connected in a ring principle, there are two paths from one the switch to another, one path is selected from the two paths as the forwarding path according to the principle of the shortest path forwarding. If the two paths have the same number of hops, the path passing the preferable stack port is selected as the forwarding path. For example, in FIG. 2, stack ports P1 I of the switches in each stack group are the preferable stack port.

Base on the above-mentioned principle, forwarding paths from a switch to other the switches in the same stack group as well as forwarding paths from a stack group of a switch to other stack groups can be determined, the stack ports or aggregated stack link groups that are forbidden to forward any packet can be found according to these forwarding paths, and then source forwarding information can be configured.

For example, to configure the local source forwarding information of the switch 201, stack ports or aggregated stack link groups along the path that is forbidden to forward any packet for the multicast packet, broadcast packet or unknown unicast packet ingressed by the switches 201~216 are found, and correspondences between the stack ports forbidden for forwarding and chip IDs as well as correspondences between the aggregated stack link groups forbidden for forwarding and chip IDs are configured in the local source forwarding information of the switch 201. For convenience of illustration, take the broadcast packet for example to illustrate a configuration method of the source forwarding information provided by the present disclosure.

In the source forwarding information of the switch 201, stack port P1 corresponds to chip IDs including ID4~ID7 and ID8~ID31.

As to the broadcast packet ingressed by the switch 203 (carrying ID4 or ID5), stack port P1 is not on the forwarding path from the switch 203 to the switch 204, and if the switch 201 sends the broadcast packet ingressed by the switch 203 to the switch Slot 4 through stack port P1, the switch 204 receives the broadcast packet ingressed by the switch 203 on two paths.

As to the broadcast packet ingressed by the switch 204 (carrying ID6 or ID7), stack port P1 is not on the forwarding path from the switch 204 to the switch 201, and if the switch 201 sends the broadcast packet ingressed by the switch 204 through its stack port P1, the switch 201 sends the broadcast packet ingressed by the switch 204 to the switch 204 again.

As to the broadcast packet ingressed by the switches 205~216 (carrying any chip ID of ID6~ID23), stack port P1 of the switch 201 is forbidden to forward any broadcast packet ingressed by the switches in stack groups 22 to 24.

As to the broadcast packet ingressed the switch 201 (carrying ID0 or ID1), stack port P1 of the switch 201 is on the forwarding path from the switch 201 to the switch 204, if the switch 201 sends the broadcast packet to the switch 204 via stack port P1, it will not lead to forwarding loop. There are two paths from the switch 202 to the switch 204 with the same number of hops: a path of 202→203→204 and another path of 202→201→204. As stack port P1 of the switch 202 is located on the former path, the former path is taken as the forwarding path from the switch 202 to the switch 204. As to broadcast packets ingressed by the switch 202 (carrying ID2 or ID3), stack port P1 of the switch 201 is on the forwarding path from the switch 202 to the switch 204, the switch 201 sends the broadcast packets ingressed by the switch 202 to the switch 204 via stack port P1 and this will not lead to forwarding loop. Therefore, in the source forwarding information of the switch 201, chip IDs corresponding to stack port P1 do not include any of ID0~ID3.

In the source forwarding information of the switch 201, stack port P2 corresponds to chip IDs including ID2~ID7.

As to the broadcast packets ingressed by the switch 202 (carrying ID2 or ID3), stack port P2 of the switch 201 is on the forwarding path from the switch 202 to the switch 201, and if the switch 201 sends the broadcast packets ingressed by switch 202 through stack port P2, it will lead to forwarding loop.

As to the broadcast packets ingressed by the switch 203 (carrying ID4 or ID5), stack port P2 of the switch 201 is not on the forwarding path from the switch 203 to the switch 202, and if the switch 201 sends the broadcast packets ingressed by the switch 203 to the switch 202 through stack port P2, the switch 202 receives the broadcast packet by the switch 202 again.

As to the broadcast packets ingressed by the switch 204 (carrying ID4 or ID5), stack port P2 of the switch 201 is not on the forwarding path from the switch 204 to the switch 202, and if the switch 201 sends the broadcast packets ingressed by the switch 204 to the switch 202 through stack port P2, the switch 202 receives the broadcast packets ingressed by the switch 204 from two paths.

Stack port P2 of the switch 201 is permitted for forwarding broadcast packets ingressed by the switches of stack groups 22 to 24. Therefore, in the source forwarding information of the switch 201, chip IDs corresponding to stack port P2 do not include any of ID8~ID15, ID16~ID23 and ID24~ID 31.

In the source forwarding information of the switch 201, aggregated stack link group G1 of stack group 21 corresponds to chip IDs including ID2~ID7, ID16~ID23 and ID24~ID31.

The broadcast packets ingressed by the other switches of stack group 21 (carrying any chip ID of ID2~ID7) may be forwarded to stack group 24 by ingressed switches through aggregated stack link group G1 of the stack group 21. if the switch 201 continues to send a broadcast packets ingressed by the other switches of stack group 21 to the switches of stack group 24 through aggregated stack link group G1 of the stack group 21, the switches of the stack group 24 will receive the broadcast packet from stack group 21 repeatedly.

There are two paths from stack group 23 to stack group 24: a path is stack group 23→stack group 24 and another path is stack group 23→stack group 22→stack group 21→stack group 24, there is one hop from stack group 23 to stack group 24 along the former path, and the former path is taken as the forwarding path from stack group 23 to stack group 24. For the broadcast packets ingressed by the switches of stack group 23 (carrying any chip ID of ID16~ID23), aggregated stack link group G1 of the stack group 21 is not on the forwarding path from the stack group 23 to the stack group 24. If the switch 201 sends a broadcast packets ingressed by the switches of the stack group 23 to the switches of the stack group 24 through the aggregated stack link group G1 of the stack group 21, the stack group 24 will receive the broadcast packets ingress by switches of the stack group 23 from two paths.

As to the broadcast packets ingressed by the switches of stack group 24 (carrying any chip ID of ID24~ID31), aggregated stack link group G1 of stack group 21 is on the forwarding path from stack group 24 to stack group 21, if the switch 201 sends the broadcast packets ingressed by the switches in stack group 24 through the aggregated stack link group G1 of the stack group 21, the switches of stack group 24 will receive the broadcast packets repeatedly.

There are two paths from stack group 22 to stack group 24: a path of stack group 22→stack group 23→stack group 24 and another path of stack group 22→stack group 21→stack group 24. The two paths have the same number of hops from stack group 22 to stack group 24. As aggregated stack link group G1 of stack group 22 is located on the former path, the former path is taken as the forwarding path from stack group 22 to stack group 24. As to the broadcast packets ingressed by the switches of stack group 22 (carrying any chip ID of ID8~ID15), aggregated stack link group G1 of the stack group 21 is on the forwarding path from stack group 22 to stack group 24, the switch 201 sends the broadcast packets ingressed by the switches of stack group 22 to stack group 24 through aggregated stack link group G1 of the stack group 21, and this will not lead to forwarding loop. Therefore, in the source forwarding information of the switch 201, the chip IDs corresponding to aggregated stack link group G1 of stack group 21 do not include any of ID8~ID15.

In the source forwarding information of the switch 201, the chip IDs corresponding to aggregated stack link group G2 of the stack group 21 include ID2~ID7, ID8~ID15, ID16~ID23 and ID24~ID31.

As to the broadcast packets ingressed by the other switches of stack group 21 (carrying any chip ID of ID2~ID7) forwarded to stack group 22 through aggregated stack link group G2 of stack group 21, and if the switch 201 sends the broadcast packets carrying any ID of ID2~ID7 to stack group 22 through aggregated stack link group G2 of stack group 21 again, stack group 22 will receive the broadcast packet from stack group 21 repeatedly.

As to the broadcast packets ingressed by the switches of stack group 22 (carrying any ID of ID8~ID15), aggregated stack link group G2 of stack group 21 is on the forwarding path from stack group 22 to stack group 21, if the switch 201 sends the broadcast packets carrying any ID of ID8~ID15 through aggregated stack link group G2 of the stack group 21, the switches of stack group 22 will repeatedly receive the broadcast packets any ID of ID8~ID15.

As to the broadcast packets ingressed by the switches of stack group 23 (carrying any ID of ID8~ID15), aggregated stack link group G2 of stack group 21 is not on the forwarding path from stack group 23 to stack group 22, and if the switch 201 sends the broadcast packets carrying any ID of ID8~ID15 to stack group 22 through aggregated stack link group G2 of the stack group 21, the switches of stack group 22 will receive the broadcast packets by the switches of stack group 23 from two paths.

As to the broadcast packets ingressed by the switches of stack group 24 (carrying any ID of ID16~ID23), aggregated stack link group G2 of stack group 21 is not on the forwarding path from stack group 24 to stack group 22, and if the switch 201 sends the broadcast packets carrying any ID of ID16~ID23 to stack group 22 through aggregated stack link group G2 of the stack group 21, the switches of stack group 22 will repeatedly receive the broadcast packets ingressed by the switches of stack group 24.

In stack group 21, the source forwarding information of the switches 202~204 is configured in the same principle of configuring the forwarding information of the switch 201, and the source forwarding information records correspondences between the stack ports forbidden for forwarding and chip IDs as well as correspondences between the aggregated stack link groups forbidden for forwarding and chip IDs. As the switch 201 is specified to forward packets ingressed by the switches of other stack groups, in the source forwarding information of any of the switches 202~204, the chip IDs corresponding to aggregated stack link groups G1 and G2 of stack group 21 includes ID8~ID15, ID16~ID23 and ID24~ID31.

According to the configuration manner of the source forwarding information of the switches of stack group 21, the stack ports and aggregated stack link group that are forbidden for forwarding are found out, and the source forwarding information of each switch of stack groups 22 to 24 is configured.

Source forwarding information tables of the switches may be configured manually, or be configured automatically by executing a computer program.

A SECOND EXAMPLE

Figure 4:
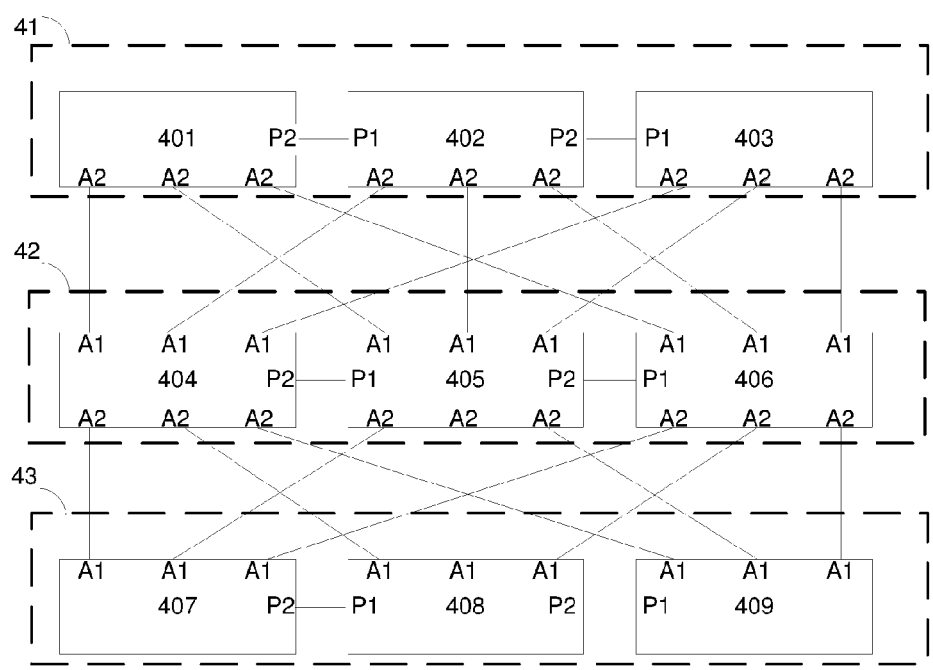
FIG. 4 is a diagram illustrating a stacked switches system in another example.

The stacked switches system shown in FIG. 4 includes stack groups 41 to 43. In a stack group 41, An intra-group stack port P2 of the switch 401 may be connected with an intra-group stack port P1 of the switch 402 via a stacking link. An intra-group stack port P2 of the switch 402 may be connected with an intra-group stack port P1 of the switch 403 via a stacking link. The switches 401 to 404 may be connected with each other to form the stack group 41 with the chain topology. Based on the same principle, the switches 404, 405, and 406 may be connected with each other to form a stack group 43 with the chain topology, using stacking links. The switches 407, 408, and 409 may be connected with each other to form a stack group 43 with the chain topology, using stacking links.

Each of the switches 401, 402, and 403 may include three stack ports A2. Each of the switches 404, 405, and 406 may include three in stack ports A1 and three stack ports A2. Each of the switches 407, 408, and 409 in the stack group 430 may include three stack ports A1. Three stack ports A2 on the switch 401 may respectively be connected with a stack port A1 on each of the switches 404, 405, and 406. Three stack ports A2 on the switch 402 may respectively be connected with a stack port A1 on each of the switches 404, 405, and 406. Three stack ports A2 on the switch 403 may respectively be connected with a stack port A1 on each of the switches 404, 405, and 406. Three stack ports A2 on the switch 404 may respectively be connected with a stack port A1 on each of the switches 407, 408, and 409. Three stack ports A2 on the switch 405 may respectively be connected with a stack port A1 on each of the switches 407, 408, and 409. Three second inter-group stack ports A2 on the switch 406 may respectively be connected with a stack port A1 on each of the switches 407, 408, and 409.

When the stacked switches system is converged, the on-work stack ports A2 of the switches 401~403 are associated with the second aggregated stack link group G2 of stack group 41 respectively, and the on-work stack ports A1 of the switches 404~406 are associated with the first aggregated stack link group G1 of stack group 42 respectively, and the on-work stack ports A1 of the switches 407~409 are associated with the first aggregated stack link group G1 of stack group 43 respectively.

In an example, each forwarding chip of each switch is associated with an exclusive identification, it is assumed that each switch shown in FIG. 4 is configured with two forwarding chips. The member IDs of the switches 401 to 409 are respectively slot 1 to slot 9. The forwarding chips of the switches in FIG. 4 are associated with IDs as shown in Table 2:

TABLE 2

| Slot ID | Slot1 | Slot2 | Slot3 | Slot4 | Slot5 | Slot6 | Slot7 | Slot8 | Slot9 |
|---|---|---|---|---|---|---|---|---|---|
| Binding ID | 0, 1 | 2, 3 | 4, 5 | 6, 7 | 8, 9 | 10, 11 | 12, 13 | 14, 15 | 16, 17 |

FIG. 5 shows the source forwarding information of the switches in the stacked switches system, and a process of the stacked switches system forwarding a broadcast packet will be illustrated with reference to FIGS. 4 and 5 hereinafter:

The switch 404 receives a broadcast packet through data port41 (not shown in FIG. 4) belonging to VLAN20, and then, the switch 404 sends the broadcast packet through other data ports of VLAN20.

If the chip which the data port41 is located on is associated with ID7, the switch 404 may add ID7 and port41 into the broadcast packet as a source ID and a source port. The switch 404 may search the local source forwarding information according to ID7, and fail to find any of stack port P2, aggregated stack link group G1 and aggregated stack link group G2, and then the switch 404 may send the broadcast packet carrying ID7 and port41 to the switch 405 through stack port P2, send the broadcast packet carrying ID7 and port41 to stack group 41 through inter-group aggregated stack link group G1, and sends the broadcast packet carrying ID7 and port41 to stack group 43 through inter-group aggregated stack link group G2. The switch 404 selects a stack port A1 and a stack port A2 on itself from inter-group aggregated stack link groups G1 and G2 respectively, and sends the broadcast packet carrying ID7 and port41 through the selected stack ports A1 and A2. If stack port A1 of the local device selected by the switch 404 from inter-group aggregated stack link group G1 is connected to stack port A2 of the switch 402 through a stack link, the switch 404 sends the broadcast packet carrying ID7 and port41 to the switch 402 of stack group 41 through aggregated stack link group G1. If stack port A2 selected by the switch 404 is connected to stack port A1 of the switch 409 through a stack link, then the switch 404 sends the broadcast packet carrying ID7 and port41 to the switch 409 of stack group 43 through aggregated stack link group G2.

The switch 405 may receive the broadcast packet carrying ID7 and port41 through stack port P1, and sends the broadcast packet with ID7 and port41 being removed through every data port of VLAN20, and search the local source forwarding information according to ID7, and fail to find stack port P2. The switch 405 may determines to send the broadcast packet carrying ID7 and port41 to the switch 406 through stack port P2.

The switch 406 may receive the broadcast packet carrying ID7 and port41 through stack port P1, and send the broadcast packet with ID7 and port41 being removed through every data port of VLAN20, and search the local source forwarding information according to ID7. The switch 406 may determine that there is neither stack port nor aggregated stack link group permitted for forwarding packets, and may discard the broadcast packet carrying ID7 and port41.

The switch 402 may receive the broadcast packet carrying ID7 and port41 through stack port A2, and send the broadcast packet with ID7 and port41 being removed through every data port of VLAN20. The switch 402 may search the local source forwarding information according to ID7, and send the broadcast packet carrying ID7 and port41 to the switches 401 and 403 through stack ports P1 and P2.

The switch 401 may receive the broadcast packet carrying ID7 and port41 through stack port P2, and send the broadcast packet with ID7 and port41 being removed through every data port of VLAN20. The switch 401 may search the local source forwarding information according to ID7, and determine that there is neither stack port nor aggregated stack link group permitted for forwarding packets, and discard the broadcast packet carrying ID7 and port41.

The switch 403 may receive the broadcast packet carrying ID7 and port41 through stack port P1, and send the broadcast packet with ID7 and port41 being removed through every data port of VLAN20. The switch 407 may search the local source forwarding information according to ID7, and may determine that there is neither stack port nor aggregated stack link group permitted for forwarding packets, and discards the broadcast packet carrying ID7 and port41.

The switch 409 may receive the broadcast packet carrying ID7 and port41 through stack port A1, and send the broadcast packet with ID7 and port41 being removed through every data port of VLAN20. The switch 409 may search the local source forwarding information according to ID7, and send the broadcast packet carrying ID7 and port41 to the switch 408 through stack port P1.

The switch 408 may receive the broadcast packet carrying ID7 and port41 through stack port P1, and send the broadcast packet with ID7 and port41 being removed through every data port of VLAN20. The switch 408 may search the local source forwarding information according to ID7, and send the broadcast packet carrying ID7 and port41 to the switch 409 through stack port P1.

The switch 407 may receive the broadcast packet carrying ID7 and port41 through stack port P1, and send the broadcast packet with ID7 and port41 being removed through every data port of VLAN20. The switch 407 may search the local source forwarding information according to ID7, and determines that neither stack port nor aggregated stack link group is permitted for forwarding packets, and discards the broadcast packet carrying ID7 and port41.

Till now, the broadcast packets ingressed by a switch 404 is sent to all the switches in the stacked switches system, and then sent to the host through data port of each switch. In this way, the broadcast packet is forwarded successfully.

When the switch 404 receives a multicast packet or an unknown unicast packet of, the switch 404 may forward the multicast packet or the unknown unicast packet to neighbor the switches and neighbor stack groups based on the source forwarding information. Finally, all the switches in the stacked switches system receive the multicast packet or the unknown unicast packet ingressed by the switch 404.

In an example, every the switch may send any of a multicast packet, broadcast packet and unknown unicast packet ingressed by itself to another switch in a neighbor stack group, and in each stack group, there is only one switch that is permitted for sending the multicast packet, broadcast packet or unknown unicast packet ingressed by a switch of another stack group to a switch of a neighbor stack group. For example, as shown in FIG. 4, the switch 404 is specified as the switch that is permitted for sending broadcast packets from another stack group to one switch of a neighbor stack group. This may avoid forwarding loop or forwarding storm among stack groups from happening.

In the stacked switches system shown in FIG. 4, there is only one path from one stack group to another that may be taken as the forwarding path, and similarly, there is only one path from one switch to another within the same stack group that may be taken as the forwarding path.

After the forwarding path from one the switch to another within the same stack group and the forwarding path from one stack group to another are found, stack ports or aggregated stack link groups in forbidden paths are found according to these forwarding paths, and the forbidden paths are configured in the source forwarding information.

To configure the source forwarding information of the switch 401, the correspondences between stack ports that are forbidden for forwarding and chip IDs as well as the correspondences between aggregated stack link groups that are forbidden for forwarding and chip IDs are selected with regard to the multicast packet, broadcast packet and unknown unicast packet ingressed by any of the switches 401~409. For convenience of illustration, take the broadcast packet for example to illustrate the configuration method of the source forwarding information.

In the source forwarding information of the switch 401, P1 corresponds to a null chip ID.

In the source forwarding information of the switch 401, P2 corresponds to chip IDs including ID2~ID5.

As to the broadcast packets ingressed by the switch 402 (carrying ID2 or ID3), stack port P2 of the switch 401 is on the forwarding path from the switch 402 to the switch 401, if the switch 401 sends the broadcast packet ingressed by the switch 402 through stack port P2, the broadcast packet ingressed by the switch 402 is forwarded to the switch 402 again.

As to the broadcast packet ingressed by the switch 403 (carrying ID4 or ID5), stack port P2 of the switch 401 is on the forwarding path from the switch 403 to the switch 401, if the switch 401 sends the broadcast packet ingressed by the switch 403 to the switch 402 through stack port P2, the broadcast packet ingressed by the switch 403 is forwarded to the switch 402 and the switch 403 again.

As to the broadcast packets ingressed by the switch 401 (carrying ID0 or ID1), stack port P2 of the switch 401 is on the forwarding path from the switch 401 to the switch 402, and forwarding loop will not happen. Therefore, in the source forwarding information of the switch 401, the chip IDs corresponding to P2 do not include ID0~ID1.

In the source forwarding information of the switch 401, aggregated stack link group G1 of stack group 1 corresponds to a null chip ID.

In the source forwarding information of the switch 401, aggregated stack link group G2 of stack group 1 corresponds to chip IDs including ID2~ID7. The broadcast packets ingressed by the switches 402 and 403 (carrying any chip ID of ID2~ID5) have been forwarded to stack group 42 through aggregated stack link group G2 of stack group 41, if the switch 401 sends the broadcast packets ingressed by the switches 402 and 403 to stack group 42 through aggregated stack link group G2 of stack group 41 again, the switches in the stack group 42 will receive the broadcast packets from stack group 41 repeatedly.

In stack group 41, it is recorded in the source forwarding information of the switches 402 and 403 the correspondences between stack ports and aggregated stack link groups that are forbidden for forwarding and chip IDs in the same principle of configuring the forwarding information of the switch 401.

According to configuration of the source forwarding information of the switches in the stack group 41, the stack ports and aggregated stack link groups that are forbidden for forwarding are found, and the source forwarding information of the switches of stack groups 2 and 3 is configured.

As aggregated stack link groups G1 and G2 of the stack group 42 are respectively on two forwarding paths (such as, a forwarding path from stack group 43 to stack group 41 and a forwarding path from stack group 41 to stack group 43), the switch 404 of stack group 41 is specified as the switch to forward the broadcast packets ingressed by a switch of another stack group to a neighbor stack group. In the source forwarding information of the switch 404, chip IDs corresponding to G2 do not include ID12~ID17, and chip IDs corresponding to G1 do not include ID0~ID5. However, in the source forwarding information of the switches 405~406, the chip IDs corresponding to aggregated stack link group G1 of stack group 42 include ID0~ID5, and the chip IDs corresponding to aggregated stack link group G2 of stack group 42 include ID12~ID17.

The source forwarding information table of the switches may be configured manually, and or in another implementation, the source forwarding information table of the switches may be configured automatically by executing a computer program.

A THIRD EXAMPLE

Figure 6:
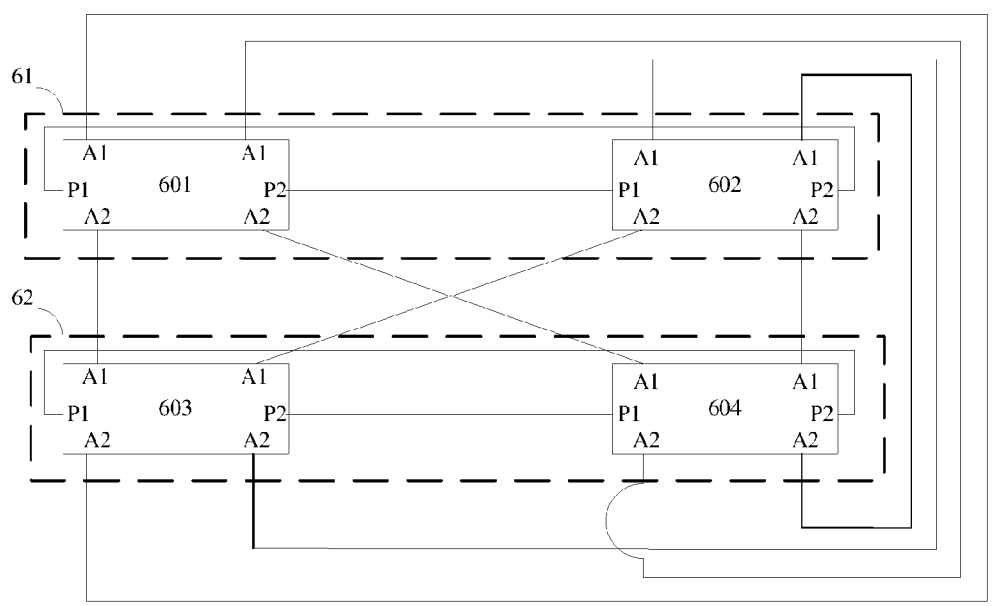
FIG. 6 is a diagram illustrating a stacked switches system in another example.

FIG. 6 shows a stacked switches system which includes stack group 61 and stack group 62. The Stack group 61 includes the switches 601 and 602, while stack group 62 includes the switches 603 and 604. The switches in stack groups 61 and 62 have intra-group stack ports P1 and P2.

In stack group 61, the stack port P2 of the switch 601 is connected to stack port P1 of the switch 602 through a stack link, while stack port P2 of the switch 602 is connected to stack port P1 of the switch 601 through a stack link. In this way, the switch 601 and the switch 602 in stack group 61 are connected with each other to form a ring topology. Similarly, the switches 603 and 604 are connected with each other to form a ring topology.

Two stack ports A1 on the switch 601 may respectively be connected with a stack port A2 on each of the switches 603 and 604; two stack ports A2 on the switch 601 may respectively be connected with a stack port A1 on each of the switches 603 and 604. Two stack ports A1 on the switch 602 may respectively be connected with a stack port A2 on each of the switches 603 and 604; two stack ports A2 on the switch 603 may respectively be connected with a stack port A1 on each of the switches 603 and 604.

When the stacked switches system is converging, the on-work stack ports A1 and A2 of the switches 601~602 are associated with a first aggregated stack link group G1 and a second aggregated stack link group G2 of stack group 61 respectively, and the on-work stack ports A1 and A2 of the switches 603~604 are associated with a first aggregated stack link group G1 and a second aggregated stack link group G2 of stack group 62 respectively.

In an example, each forwarding chip of each switch is associated with an exclusive identification, and it is assumed that every the switch shown in FIG. 6 is set with two forwarding chips. The member IDs of the switches 601 to 608 are respectively slot 1 to slot 4. The forwarding chips of the switches in FIG. 6 are associated with IDs listed in Table 3 as below:

TABLE 3

| Slot ID | Slot1 | Slot2 | Slot3 | Slot4 |
|---|---|---|---|---|
| Binding ID | 0, 1 | 2, 3 | 4, 5 | 6, 7 |

The switch 601 receives an unknown unicast packet of through data port 13 (not shown in FIG. 6) belonging to VLAN30, then the switch 601 sends the unknown unicast packet through other data ports of VLAN30. The chip which the data port 13 is located on is associated with ID0, and the switch 601 may add ID0 and port 13 into the unknown unicast packet as a source ID and a source port. The switch 601 may search the local source forwarding information based on the ID0, and find the stack port P2 and aggregated stack link group G2 that are forbidden to forward the unknown unicast packet carrying source ID0. The switch 601 may determine that stack port P1 and aggregated stack link group G1 are permitted for forwarding the unknown unicast packet carrying source ID0 port 13. The switch 601 sends the unknown unicast packet carrying ID0 and port 13 to the switch 602 through stack port P1, and sends the unknown unicast packet carrying ID0 and port 13 to the stack group 62 through inter-group aggregated stack link group G1. The switch 601 may select stack port A1 belonging to the inter-group aggregated stack link group G1 of the stack group 61 and send the unknown unicast packet carrying ID0 and port 13 through the selected sack port A1. If stack port A1 selected by the switch 601 is connected to stack port A2 of the switch 603 through a stack link, the switch 601 send the unknown unicast packet carrying ID0 and port 13 to the switch 603.

The switch 602 may receive the unknown unicast packet carrying ID0 and port 13 through stack port P1, send the unknown unicast packet with ID0 and port 13 being removed through every data port of VLAN30. The switch 602 may search the local source forwarding information based on the ID0, and find that stack port P1, stack port P2, aggregated stack link group G1 and aggregated stack link group G2 are all forbidden to forward any packet. So, the switch 602 discards the unknown unicast packet carrying ID0 and port 13.

The switch 603 may receive the unknown unicast packet carrying ID0 and port 13 through stack port A2, and send the unknown unicast packet with ID0 and port 13 being removed through a data port of VLAN30. The switch 603 may search the local source forwarding information based on the ID0, and determine that stack port P2 is permitted for forwarding packets. Then, the switch 603 may send the unknown unicast packet carrying ID0 and port 13 through stack port P2.

The switch 604 may receive the unknown unicast packet carrying ID0 and port 13 through stack port P1, and the switch 604 may send the unknown unicast packet with ID0 and port 13 being removed through a data port of VLAN30. The switch 604 may search the local source forwarding information based on the ID0, and determine that the stack port P1 stack port which permits for forwarding is a receiving port of the unknown unicast packet. Thus, the switch 604 discards the unknown unicast packet carrying ID0 and port 13.

The switches 601 and 602 may send the multicast packet, broadcast packet or unknown unicast packet ingressed by itself to the switch 603 or 604 through aggregated stack link group G1 of the stack group 61. Similarly, the switches 603 and the switch 604 may send the multicast packet, broadcast packet or unknown unicast packet ingressed by itself to the switch 601 or 602 through aggregated stack link group G1 of the stack group 62.

In FIG. 6, for example, stack port P1 of the switch 601 and stack port P2 of the switch 602 are specified as the stack ports that are forbidden to send any multicast packet, broadcast packet or unknown unicast packet ingressed by the switches 603 and 604 to a neighbor switch in the stack group 61, stack port P1 of the switch 603 and stack port P2 of the switch 604 are specified as the stack ports that are forbidden to send any multicast packet, broadcast packet or unknown unicast packet ingress by the switches 601 and 602 to a neighbor switch in the stack group 62. As shown in FIG. 6, stack port P1 on each switch is permitted for forwarding any of multicast, broadcast and unknown unicast packets ingressed by the switch itself, and stack port P2 on each switch is forbidden to forward any of the multicast, broadcast and unknown unicast packets ingressed by the switch itself.

Based on the above, the forwarding path from a switch to another in the same stack group as well as the forwarding path from a stack group to another may be determined, and the stack ports or aggregated stack link groups that are forbidden to forwarding any of the multicast packet, the broadcast packet and a unknown unicast packet are found out according to these forwarding paths, and then, the source forwarding information is configured.

For convenience of illustration, take the broadcast packet for example to illustrate the configuration method of the source forwarding information.

In the source forwarding information of the switch 601, stack port P1 corresponds to chip IDs including ID2~ID3 and ID4~ID7.

As to the broadcast packets ingressed by the switch 602 (carrying ID2 or ID3), if the switch 601 sends the broadcast packet ingressed by the switch 602 through stack port P1, the broadcast packet ingressed by the switch 602 will be sent to the switch 602 again, which will lead to forwarding loop.

As to the broadcast packets ingressed by the switches 603~604 (carrying any ID of ID4 to ID7), stack port P1 of the switch 601 is forbidden to forward any broadcast packet ingressed by any switch in stack group 62.

In the source forwarding information of the switch 601, stack port P2 corresponds to chip IDs including ID0~ID3.

As to the broadcast packets ingressed by the switch 601 (packet carrying ID0 or ID1), stack port P2 of the switch 601 is forbidden to forward any broadcast packet ingressed by the local device to the switch 602. If the switch 601 sends the broadcast packet ingressed by the local device to the switch 602 through stack port P2, the switch 602 will receive the broadcast packet ingressed by the switch 601 repeatedly.

As to the broadcast packets ingressed by the switch 602 (carrying ID2 or ID3), stack port P2 of the switch 601 is on the forwarding path from the switch 602 to the switch 601, if the switch 601 sends a broadcast packet ingressed by the switch 602 through stack port P1, the broadcast packet ingressed by the switch 602 will be returned to the switch 602.

In the source forwarding information of the switch 601, aggregated stack link group G1 of the stack group 61 corresponds to chip ID2~ID3 and chip ID4~ID7.

As the broadcast packet ingressed by the switch 601 has been forwarded by the switch 602 to stack group 62 through aggregated stack link group G1 of stack group 61, if the switch 601 continues to send the broadcast packet ingressed by the switch 602 to stack group 62 through aggregated stack link group G1 of stack group 61, the switches 603~604 will receive the broadcast packet ingressed by the switch 602 repeatedly.

As to the broadcast packets ingressed by the switches 603 and 604 (carrying any chip ID of ID4~ID7), if the switch 601 sends the broadcast packet ingressed by the switches 603 and 604 through aggregated stack link group G1 of the stack group 61, the switches 603 and 604 will receive the broadcast packet repeatedly.

In stack group 61, according to the configuration manner of the forwarding information of the switch 601, the source forwarding information of the switch 602 is configured, and the source forwarding information records the correspondence between stack ports and aggregated stack link groups that are forbidden for forwarding and chip IDs.

The source forwarding information of the switches shown in FIGS. 3A-3D, 5 and 7 may be in another form, where the source forwarding information of the switches may record the correspondences between the binding IDs of the switches and stack ports that are permitted for forwarding and the correspondences between the binding IDs of the switches and aggregated stack link groups that are permitted for forwarding.

FIG. 8 shows another form of the source forwarding information of the switches in the stacked switches system shown in FIG. 6.

The switch 601 receives an unknown unicast packet through data port 13 (not shown in FIG. 6) belonging to VLAN30, then the switch 601 may send the unknown unicast packet through other data ports of VLAN30. The data port through which the switch 601 receives the unknown unicast packet is in the chip associated with ID0, and the switch 601 may add ID0 and port 13 to the received unknown unicast packet as a source ID and a source port. The switch 601 may search the local source forwarding information based on the ID0, and finds stack port P1 and aggregated stack link group G1 that are permitted for forwarding. The switch 601 may send the unknown unicast packet carrying ID0 and port 13 to the switch 602 through stack port P1, and send the unknown unicast packet carrying ID0 and port 13 to stack group 62 through inter-group aggregated stack link group G1 of the stack group 61. The switch 601 may select stack port A1 belonging to the local device from inter-group aggregated stack link group G1 of the stack group 61, and send the unknown unicast packet carrying ID0 and port 13 through the selected stack port A1. If stack port A1 selected by the switch 601 is connected to stack port A2 of the switch 603 through a stack link, the switch 601 may send the unknown unicast packet carrying ID0 and port 13 to the switch 603.

The switch 602 may receive the unknown unicast packet carrying ID0 and port 13 through stack port P2, and send the unknown unicast packet with ID0 and port 13 being removed through the data port of VLAN30. The switch 602 may not find any stack port P1, stack port P2, aggregated stack link group G1 or aggregated stack link group G2 that are permitted for forwarding, so the switch 602 discards the unknown unicast packet carrying ID0 and port 13.

The switch 603 may receive the unknown unicast packet carrying ID0 and port 13 through stack port A2, and may send the unknown unicast packet with ID0 and port 13 being removed through the data port of VLAN30. The switch 603 may search the local source forwarding information based on the ID0 and finds stack port P2 that is permitted for forwarding packets, and find the stack port P2 corresponds to the ID0. The switch 603 may send the unknown unicast packet carrying ID0 and port 13 to the switch 604 through the stack port P2.

The switch 604 may receive the unknown unicast packet carrying ID0 and port 13 through stack port P1, and sends the unknown unicast packet with ID0 and port 13 being removed through the data port of VLAN30, searches the local source forwarding information based on the ID0 and finds stack port P1 that is permitted for forwarding packets. The switch 604 discards the unknown unicast packet carrying ID0 and port 13 based on a filtering rule.

In the above-mentioned several examples of the stacked switches system, several methods of flooding the broadcast packets, unknown unicast packets or multicast packets ingressed by a switch therein to all other the switches of the stacked switches system are illustrated. It should be noted that the packet forwarding method of the present disclosure is not limited to those mentioned above.

Thus, by finding the paths permitted for forwarding packets or forbidden to forward any packet, the source forwarding information of each switch in the stacked switches system is configured, and the broadcast packet, unknown unicast packet or multicast packet ingressed by a switch can be flooded to all other the switches in the stacked switches system.

Figure 9:
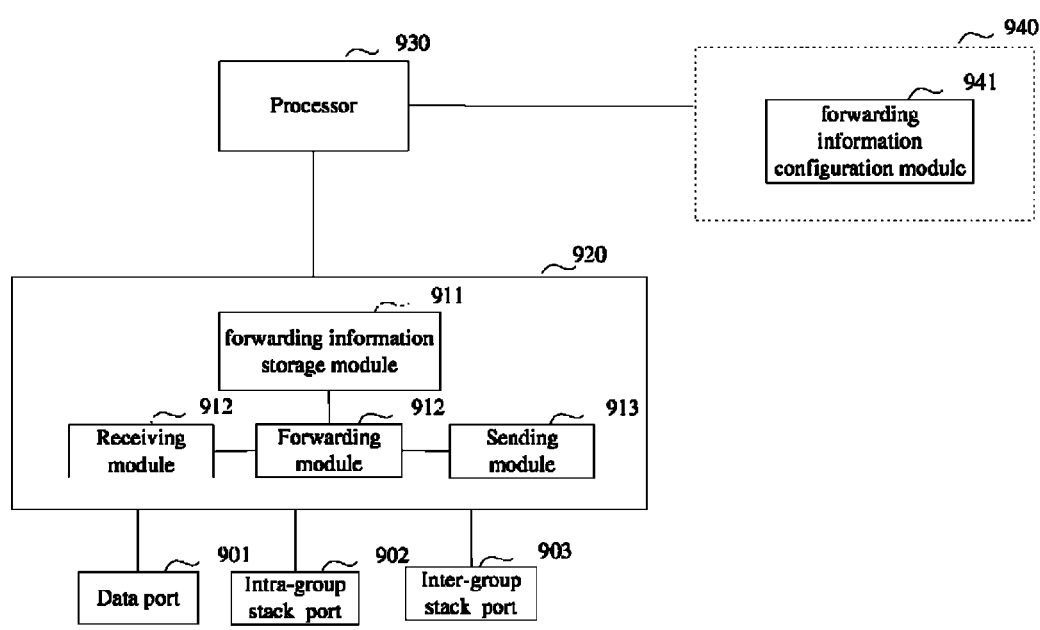
FIG. 9 is a diagram illustrating a structure of a device in another example.

FIG. 9 is a schematic diagram illustrating a packet forwarding device, applied to an apparatus serving as a member device in a stacked switches system, according to an example of the present disclosure. The stacked switches system may include at least two stack groups and a plurality of member devices, in which the number of the member devices is greater than the number of the stack groups.

As shown in FIG. 9, the device includes a data port 901, an intra-group stack port 902 and an inter-group stack port 903 belongs an aggregated stack link group, a forwarding unit 910, a processor 920 and a storage unit 930 connected with the processor 920. The forwarding unit 910 may include forwarding information storage module 911, a receiving module 912, a forwarding module 913 and a sending module 914. The storage unit 930 includes one or more program modules executable by the processor 920. The one or more program modules in the storage unit 930 include a forwarding information configuration module 941 for configuring broadcast forwarding information in the storage module 911. In some examples there may be more than one data port.

The storage module 911 may store the broadcast forwarding information. The receiving module 912 may receive an packet which is to be sent to every member device in the plurality of stack groups of the stacked switches system The forwarding module 913 may identify an intra-group port and an aggregated stack link group which permit forwarding the packet based on an ingress member device identification of the packet. The sending module 914 may send the packet carrying the ingress member device identification via the identified intra-group stack port, send the packet carrying the ingress member device identification via the identified aggregated stack link group, and send the packet via the data port.

In an example, the intra-group stack port connects with one neighbor member device in one same stack group. In an example, the inter-group stack link aggregation connects with a neighbor stack group. In an example, the packet received via the receiving module 912 is a broadcast packet, and the data port belongs to a Virtual Local Area Network which the broadcast packet belongs to.

In an example, the packet received via the receiving module 912 is an unknown unicast packet, and the data port belongs to a VLAN which the unknown unicast packet belongs to.

In an example, the packet received via the receiving module 912 is a multicast packet; the data port belongs to a multicast group which multicast group address in the multicast packet belongs to.

The forwarding unit shown in FIG. 9 may be a forwarding chip.

In the various examples shown in FIGS. 1 to 9, the protocol packet or data packet with ingress/egress to by the data port of the switch is an Ethernet packet. A switch may also directly add the ingress member device identification and an ingress port identification to a protocol packet or data packet when receiving such packet through a data port. If a switch is to output a protocol packet or data packet ingressed by its own data port through other data ports, the added ingress member device identification and ingress port identification is removed before the packet is outputted.

It can be seen from the above technical schemes that, in a stacked switches system of a matrix topology, when a switch in the stacked switches system receives an Ethernet packet through a data port, if the destination MAC address of the Ethernet packet is a broadcast address or unknown unicast address or multicast address, such packet can be flooded to every switch of the stacked switches system.

The above description just shows examples of the present disclosure, but not used to limit the present disclosure, and any modification, equivalent replacement and improvement within principle of the present disclosure are within the protection scope of the present disclosure.

What is claimed is:

1. A method comprising:
   receiving, by a given member device of a plurality of member devices of a stacked switches system including a plurality of stack groups over which the member devices are organized, a packet which is to be sent to every member device in the stack groups of the stacked switches system;
   assigning the packet with an ingress member device identification that is unique to the given member device, the ingress member device identification assigned to the packet associated with a port on which the packet was received;
   identifying an intra-group stack port and an aggregated stack link group which permit forwarding the packet, each of the intra-group stack port and the aggregated stack link group identified based on the ingress member device identification of the packet;
   sending the packet carrying the ingress member device identification via the identified intra-group stack port;
   sending the packet carrying the ingress member device identification via the identified aggregated stack link group; and
   sending the packet via a local data port of the member device.

2. The method of claim 1, further comprising:
   the intra-group stack port connects the member device with a neighbor member device; said member device and neighbor member device being in a same stack group.

3. The method of claim 1, wherein,
   the inter-group stack link aggregation connects the member device with a neighbor stack group.

4. The method of claim 1, wherein the packet is a broadcast packet;
   wherein, the local data port belongs to a Virtual Local Area Network which the broadcast packet belongs to.

5. The method of claim 1, wherein the packet is a unknown unicast packet;
   wherein, the local data port belongs to a Virtual Local Area Network (VLAN) which the unknown unicast packet belongs to.

6. The method of claim 1, wherein the packet is a multicast packet;
   wherein, the data port belongs to a multicast group which the multicast packet belongs to.

7. An apparatus comprising:
   a plurality of intra-group stack ports to communicatively connect the apparatus to every adjacent member device of a same aggregated stack link group of the apparatus;
   a plurality of inter-group stack ports to communicatively connect the apparatus to every member device of every adjacent aggregated stack link group;
   a processor to:
     receive a packet which is to be sent to every member device in ever stack link group;
     assign the packet with an ingress member identification that is unique to the apparatus, the ingress member device identification assigned to the packet associated with a port on which the packet was received;
     identify a selected intra-group stack port and a selected aggregated stack link group which permit forwarding the packet, each of the selected intra-group stack port and the selected aggregated stack link group port identified based on the ingress member device identification of the packet;
     send the packet carrying the ingress member device identification via the identified selected intra-group stack port, and send the packet carrying the ingress member device identification via the identified selected aggregated stack link group.

8. The apparatus of claim 7,
   wherein each intra-group stack port connects the apparatus with one neighbor adjacent member device in the same aggregated stack link group.

9. The apparatus of claim 7, wherein
   the inter-group stack link aggregation connects with a neighbor stack group.

10. The apparatus of claim 7, wherein the packet is a broadcast packet.

11. The apparatus of claim 7, wherein the packet is a unknown unicast packet.

12. The apparatus of claim 7, wherein the packet is a multicast packet.

13. The apparatus of claim 7, wherein the processor is further to store broadcast forwarding information of the stacked switches system;

identify the intra-group stack port and the aggregated stack link group by searching the forwarding information based on the ingress member device identification.

14. The method of claim 1, wherein each stack group comprises a subset of the member devices, each member device of the stack group connected to every other member device of the stack group to which the member device is adjacent.

15. The method of claim 14, wherein each member device of each stack group is connected to each member device of every other stack group to which the stack group is adjacent.

16. The method of claim 1, wherein each member device of each stack group has a plurality of unique member device identifications.

17. The method of claim 16, wherein each unique member device identification of each member device is associated with a forwarding chip of the member device.

18. The method of claim 1, wherein identifying the intra-group stack port comprises:

looking up the ingress member device identification within a list of forbidden intra-group stack ports; and selecting the intra-group stack port as any intra-group stack port not listed within the list of forbidden intra-group stack ports for the ingress member device identification.

19. The method of claim 18, wherein identifying the aggregated stack link group comprises:

looking up the ingress member device identification within a list of forbidden aggregated stack link groups; and selecting the aggregated stack link group as any aggregated stack link group not listed within the list of forbidden aggregated stack link groups for the ingress member device identification.

20. A non-transitory computer-readable data storage medium storing program code executable by a processor of a given member device to:

receive a package to be sent to every member device of a plurality of member devices of a stacked switches system including a plurality of stack groups over which the member devices are organized;

assign the packet with an ingress member device identification that is unique to the given member device, the ingress member device identification assigned to the packet associated with a port on which the packet was received;

identify an intra-group stack port and an aggregated stack link group which permit forwarding the packet, each of the intra-group stack port and the aggregated stack link group identified based on the ingress member device identification of the packet;

send the packet carrying the ingress member device identification via the identified intra-group stack port;

send the packet carrying the ingress member device identification via the identified aggregated stack link group; and send the packet via a local data port of the member device.

* * * * *